No. 618,499. Patented Jan. 31, 1899.
A. D. EDWARDS.
BAKING AND COOKING VESSEL.
(Application filed Feb. 24, 1898.)

(No Model.)

ATTEST
R. B. Moser
H. M. Sharp

INVENTOR
Ansel D. Edwards
By H. F. Fisher ATTY

UNITED STATES PATENT OFFICE.

ANSEL D. EDWARDS, OF CLEVELAND, OHIO.

BAKING AND COOKING VESSEL.

SPECIFICATION forming part of Letters Patent No. 618,499, dated January 31, 1899.

Application filed February 24, 1898. Serial No. 671,409. (No model.)

*To all whom it may concern:*

Be it known that I, ANSEL D. EDWARDS, a citizen of the United States, residing at Cleveland, in the county of Cuyahoga and State of Ohio, have invented certain new and useful Improvements in Baking and Cooking Chambers or Vessels; and I do declare that the following is a full, clear, and exact description of the invention, which will enable others skilled in the art to which it appertains to make and use the same.

My invention relates to a new style of baking and cooking chamber or vessel which is especially made and adapted to be used with a form of oil heating-stove which has of late years become popular and wherein the burner is in the base of the stove and there is a sheet-metal cylindrical body surmounted by an ornamental removable top. Many such stoves are now used in flats and other places where space is an important consideration and wherein a small family may live with a single room heated by one of the above-described burners.

The object of my invention is to utilize such a stove for cooking meals and baking, thereby availing myself of the heat which would be necessary anyway for this additional purpose and then, when the cooking has been done, simply removing the chamber and replacing the ornamental top and having only a heating-stove, as before. I am thus enabled to avoid the appearance of a kitchen in the sitting and bed room and am not encumbered with a cooking-stove, while I have all the advantages practically of such a stove in the temporary combination above suggested.

Figure 1:
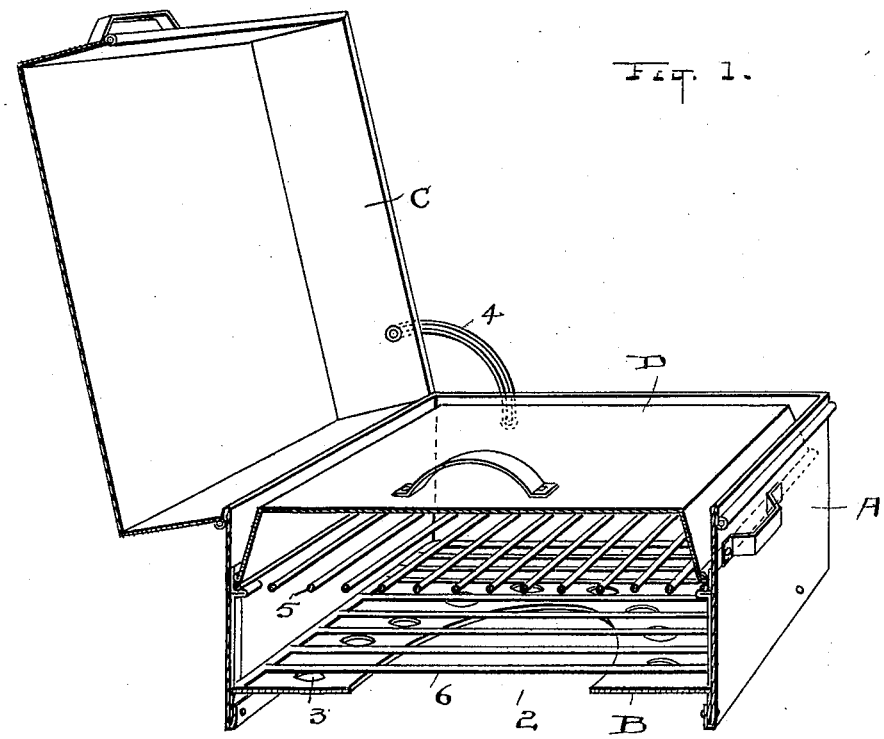
Figure 2:
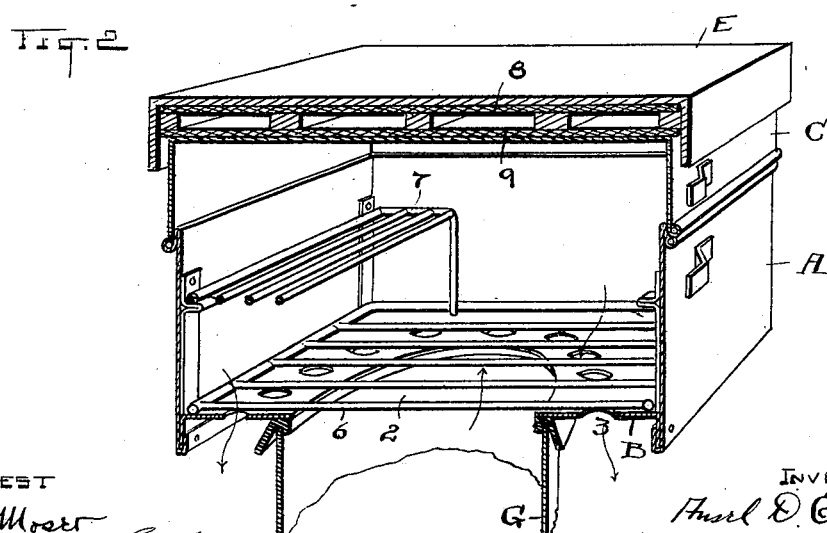

Referring to the accompanying drawings, Figure 1 is a perspective elevation of my new and improved cooking-chamber with the lid or top raised and one side removed to disclose the inside. Fig. 2 is a perspective elevation with one side removed as above, but with the lid down and a supplemental or auxiliary cover over all and a section of the stove beneath.

Now having in view the use to which this chamber or vessel is to be applied, A represents the preferably rectangular body thereof made of a single thickness of sheet metal, so that steam and moisture generated in cooking can be easily wiped or dried off and rusting out of the walls is avoided, as would occur if two or more layers of metal were used.

B is the bottom of the chamber, provided with a circular opening 2 centrally and a series of smaller openings 3 around the center outside the stove-body.

C is the lid or top of the chamber, hinged thereon, to be raised and lowered and having a segmental stop 4 at one side. This or any other sufficient means to hold the top about, as shown, may be used. This top has preferably a depth equal to about one-third the entire depth of the chamber when the top is down, which makes the inside of the chamber available to get at the articles being cooked when the top is raised. Both top and sides are close to avoid the escape of heat, and the top, like the side or body, is of single sheet metal, thus also making a very light top, which is easily handled, and much handling is required in this use.

Inside the chamber the furnishings are according to the articles to be cooked or baked. For example, in Fig. 1 I show two grids or grates 5 and 6 at different elevations removably supported one on lugs and the other on the bottom B, and above this is a removable sheet-metal lid D, which comes up on a plane even with the body of the side A. For broiling meats or for any cooking where a close top heat is wanted this cover is very useful, as also for making toast, or by carrying it down to rest on the lower grid still better results are obtained and top-browning for some things can be gotten much more satisfactorily than as shown—for example, flannel-cakes or buckwheat-cakes spread on a suitable vessel and set onto the lower grid, with the top grid over all.

In Fig. 2 a still different arrangement of parts is shown. Here we have grid 6 and a shelf-grid 7, which likewise is removable. This latter enables some disk or dishes to cook thereon, while the larger room is given to work from above on the lower grid. A little practice soon enables one to ascertain what amount of heat is available at one place or elevation or another with or without the cover D or with the said cover alone or supplemented by the outer cover C. So, also, will experience soon teach economy in the space used and the things that can be cooked together.

In some cases the cover D is not desirable and the room is required for perfect top heating and browning, as roasting a chicken or in baking bread or pies. In such case D is removed, the lid C is closed, and over all I place a temporary and removable non-conducting cover E. This cover is preferably made with a wood exterior, flanged about its side and having an air-space between two sheets of asbestos 8 and 9. This perfectly confines the heat and promotes the browning effect in the top of the chamber.

I may of course use all the parts interchangeably as they may be adapted to or for such use and dispense with or use this or that part as occasion requires. Finally, when through with the chamber it can be closed up and set away and covered over with a throw of some kind, so as to completely conceal or disguise its use.

The outer cover E is used for special and exceptional purposes and does not enter into the current cooking. Hence it is removable and placed out of the way when not in use.

It will be noticed that the chamber has a top lid C, and this is essential on account of the character of work done therein, thus enabling a dish or vessel to remain in the chamber and the cooking to be continued while the lid is temporarily raised to add seasoning or to do any of the many different things required to be done while they are on the stove. By means of the grates or girds the bottom surface is multiplied.

As nearly as can be the vessels containing food are covered.

It should have been explained that the outer row of holes 3 serve to establish circulation of the heat in the chamber, which enters from the stove through the central hole 2 and rises to the top, while the cooler air gravitates to the bottom and goes out said holes, which come outside the top of the stove-body G, a section of which is shown in Fig. 2.

The inside lid or cover D is shown in Fig. 1 in its highest elevation, and in Fig. 2 it is entirely removed. Sometimes it is desirable to cover the oven over on a very low plane, and thus utilize the heat for top baking, broiling or the like. In such cases the lid D is lowered to rest at its downward edges on the bottom B or upon the grid 6, which lies on said bottom and which is the same thing practically.

What I claim is—

1. The oven, substantially as described, having an open-work bottom and close sides and a top cover, in combination with a removable inside lid, and a removable outside non-conducting cover, substantially as described.

2. The cooking and baking oven having closed sides and closely-covered top, and a bottom with a central inlet-opening for the admission of the heat and a series of outlet-openings about said central opening, in combination with an imperforate removable inside lid constructed to cover the oven entirely over on a plane below the top cover, and means in the oven to support said lid at different elevations, whereby a non-conducting chamber is formed between the said lid and cover and the heat is confined beneath said inside lid, substantially as described.

3. The oven substantially as described, having a top cover to be raised and a bottom with a central opening to admit heat and outlets about said opening, in combination with a separate removable inside lid beneath said top cover, and a separate cover of non-conducting material on top of said top cover, substantially as described.

Witness my hand to the foregoing specification this 12th day of February, 1898.

ANSEL D. EDWARDS.

Witnesses:
H. T. FISHER,
R. B. MOSER.